United States Patent [19]
Richard, Jr. et al.

[11] 3,895,811
[45] July 22, 1975

[54] FACE SEALING ARRANGEMENT FOR AUTOMOTIVE WATERPUMPS AND THE LIKE AND FACE SEAL ASSEMBLY THEREFOR

[75] Inventors: Raymond L. Richard, Jr.; Peter M. Sampatacos, both of Port Clinton, Ohio

[73] Assignee: General Motors Corporation, Detroit, Mich.

[22] Filed: July 19, 1974

[21] Appl. No.: 490,066

[52] U.S. Cl. .................. 277/22; 277/42; 277/41; 277/43; 277/65; 277/67
[51] Int. Cl. ............................................ F16j 15/40
[58] Field of Search ............ 277/22, 39, 40, 41, 42, 277/43, 88, 89, 90, 65, 67

[56] References Cited
UNITED STATES PATENTS

| | | | |
|---|---|---|---|
| 2,365,351 | 12/1944 | Matter | 277/36 |
| 2,462,280 | 2/1949 | Payne | 277/43 X |
| 2,499,353 | 3/1950 | Brummer | 277/42 X |
| 3,515,393 | 6/1970 | Metcalfe | 277/42 |

*Primary Examiner*—Samuel B. Rothberg
*Attorney, Agent, or Firm*—F. J. Fodale

[57] ABSTRACT

An automotive waterpump subassembly comprises a sheet metal housing rotatably supporting an impeller drive shaft by a pair of ball bearing complements located in a sealed chamber in the housing. The impeller drive shaft protrudes through an opening in a sheet metal end plate and carries an impeller on its exposed end which is disposed in a water filled pump chamber (not shown) when the subassembly is attached to an engine (also not shown). The sheet metal end plate carries an annular ceramic face seal element under a circumferential compressive stress without any intervening heat insulative material, such as rubber, to avoid detrimental tensile stresses and improve heat dissipation during operation. The ceramic face seal element sealingly engages a carbon face seal element forming part of a face seal assembly carried by the impeller shaft. The face seal assembly, per se, is an improvement of present known designs.

1 Claim, 3 Drawing Figures

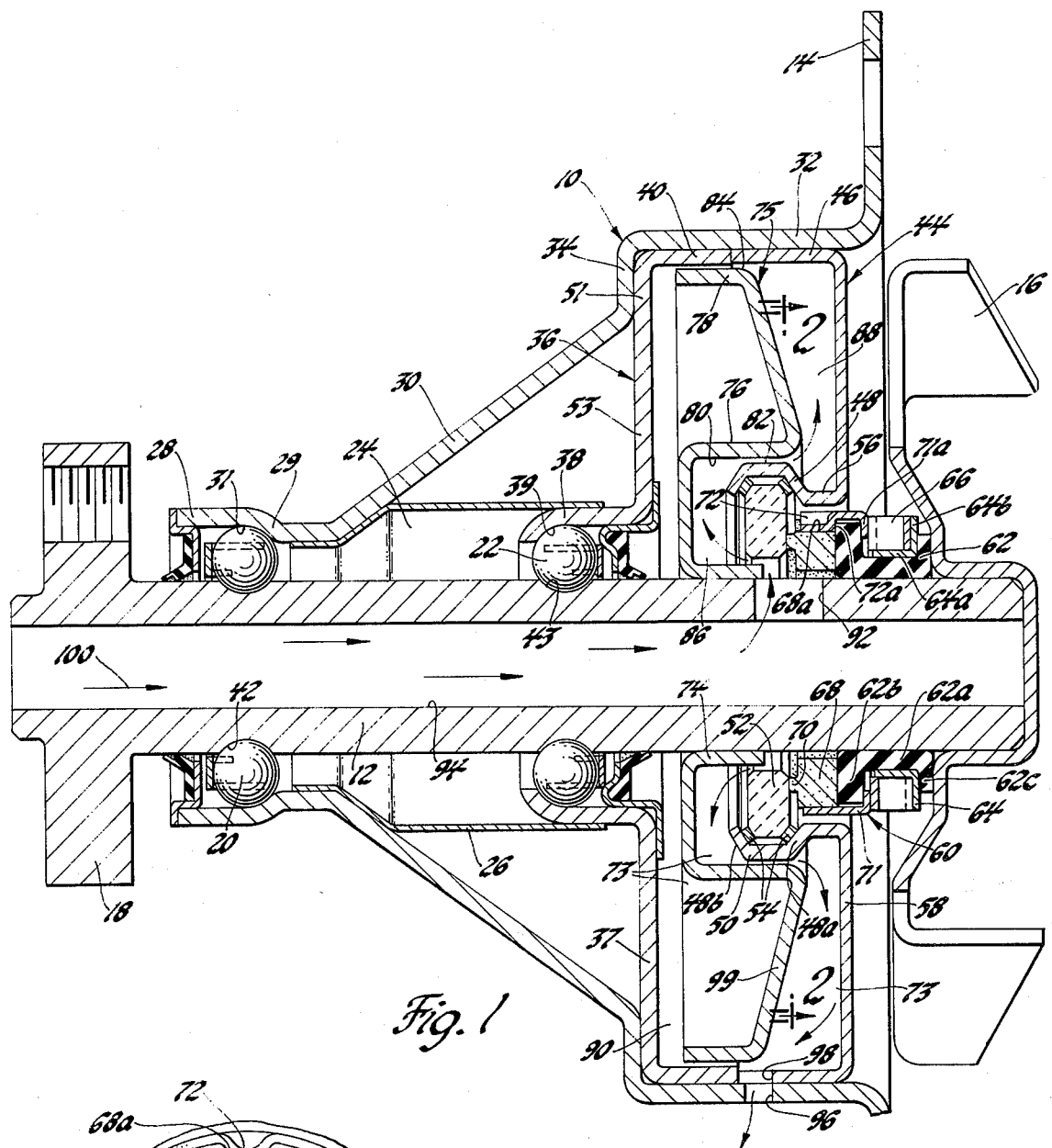
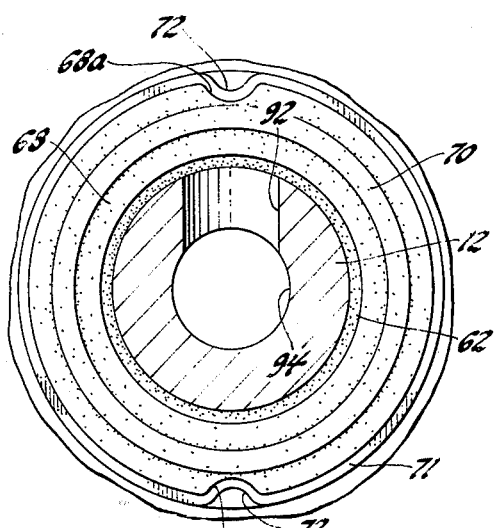
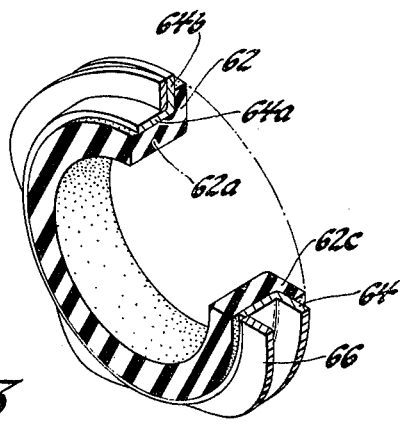
Fig. 1
Fig. 2
Fig. 3

FACE SEALING ARRANGEMENT FOR AUTOMOTIVE WATERPUMPS AND THE LIKE AND FACE SEAL ASSEMBLY THEREFOR

This invention relates generally to a face sealing arrangement for automotive waterpumps and the like and a face seal assembly therefor.

Automotive waterpumps generally comprise a subassembly which includes all of the essential parts of the waterpump except for the pump chamber and chamber inlet and outlet. The subassembly is usually bolted onto an engine block over an opening into the engine block which provides the pump chamber and chamber inlet and outlet as an integral part of the engine block.

Consequently automotive waterpump subassemblies generally include a drive shaft protruding from both ends of a housing. An impeller is carried on one protruding end of the drive shaft and the other protruding end of the drive shaft carries a flange to which is bolted the fan and a drive pulley for imparting rotation to the fan and the impeller. The drive shaft is normally rotatably supported in the housing by a sealed antifriction bearing arrangement and such subassemblies conventionally further include a face sealing arrangement between the impeller end of the shaft to protect the bearings from water contamination.

While waterpump subassemblies have generally included other protection against water or moisture reaching the antifriction bearings, such as secondary lip seals and slingers, the first barrier is the face sealing arrangement.

Consequently in its broadest aspects, the object of this invention is to provide improvements in face sealing arrangements for automotive waterpumps or the like.

If one of its aspects, an object of this invention is to provide a face seal assembly of the type having a spring biased face seal element which is an improvement over that disclosed in the U.S. Pat. No. 2,499,353 granted to Olin Brummer on Mar. 7, 1950 for a "Unitary Seal Device" and all other face seal arrangements of which we are aware.

Particularly with regards to our face seal assembly one of our objects is to provide a rugged and compact assembly having a minimum number of parts.

Another object is to provide a face seal assembly in which the spring forces are more evenly distributed, particularly with regard to the aforementioned Brummer Unitary Seal Device.

Still another object is to provide a face seal assembly which features an elastomeric element for sealing engagement with a shaft which is rugged and durable in comparison with those previously known, particularly in comparison to the aforementioned Brummer Unitary Seal Device.

Yet another object is to provide a face seal which while comprising a minimum number of parts is easier to assemble in comparison to those of which we are aware particularly the aforementioned Brummer Unitary Seal Device.

In another of its aspects an object of this invention is to provide an improved face seal arrangement having an element made of a durable and long lasting, but tensile weak, material, such as ceramic, in which the element is mounted in a metal support under circumferential compressive stress without any intervening heat insulative member to avoid tensile stresses and improve heat dissipation during operation.

While it is preferable to use both aspects of our improved face sealing arrangement, improvements will result from the separate use of our improved face seal assembly and in our improved mounting arrangement for a durable and long lasting, but tensile weak, face seal element.

Further either or both aspects of our improved face sealing arrangement may be used in conjunction with other improvements relating to automotive waterpumps, to wit, those improvements which form the subject matter of U.S. patent application Ser. No. 383,083 filed July 27, 1973 for an "Axially Preloaded Bearing Assembly" and U.S. patent application Ser. No. 383,124 filed July 27, 1973 for an "Automotive Waterpump Subassembly With Improved Sealing Arrangement", both of which are assigned to the same assignee as this invention.

Other objects and features of the invention will become apparent to those skilled in the art as the disclosure is made in the following detailed description of a preferred embodiment of the invention as illustrated in the accompanying sheet of drawing in which:

FIG. 1 is an axial section through an automotive waterpump subassembly which includes both a face sealing arrangement and a face seal assembly in accordance with our invention.

FIG. 2 is a section taken substantially along the line 2—2 of FIG. 1.

FIG. 3 is a perspective of portions of the face seal assembly shown in FIG. 1.

Referring now to the drawings, the automotive waterpump subassembly comprises a stamped sheet metal housing 10 which rotatably supports a hollow impeller drive shaft 12. The housing 10 has an outward mounting flange 14 at the right end for connecting the housing 10 to an engine block (not shown) such that the impeller 16 carried on the right end of the shaft 12 is disposed in a water jacket in the engine block for recirculating water through the cooling system of the engine. An integrally formed flange 18 at the left end of the shaft 12 provides a connection means for a drive pulley (not shown) which is belt driven by the engine.

The hollow impeller drive shaft 12 is rotatably mounted by a pair of axially spaced bearing ball complements 20 and 22 located in a sealed bearing chamber 24 in the housing 10. The sheet metal housing 10 has a smaller diameter cylindrical end portion 28 and a contiguous necked portion 29 which forms an outer angular contact raceway 31 located to the interior side of the ball complement 20 which it engages. The necked portion 29 in turn is contiguous with a conical portion 30 connected to a larger diameter cylindrical end portion 32 by a short radial wall portion 34. The outwardly extending flange 14, by which as previously mentioned the housing 10 is secured to the engine, is at the end of the larger diameter end portion 32.

A stamped sheet metal wall plate 36 having a generally radial wall 37 with oppositely extending flanges 38 and 40 at its inner and outer peripheries respectively is disposed in the larger diameter cylindrical end portion 32 of the housing 10 against the short radial wall 34. The free end of the inner flange 38 is curved radially inwardly forming an angular contact raceway 39 located to the interior side of the bearing ball complement 22 which it engages. The bearing ball complements 20 and 22 run in full ball grooves 42 and 43 formed in the outer surface of the shaft 12. If desired, bearing inserts of wear resistant material covering the angular contact raceways 31 and 39 may be provided for the ball complements 20 and 22 to roll on. As illustrated, the ball complements 20 and 22 have sheet metal separators of the axially insertable type, although any type of separator can be used for the ball complement 20 and any type of separator which can be assembled into an operative relationship with the ball complement 22 after the ball complement is disposed in the raceways 31 and 39 can be used for the ball complement 22.

In its assembled position, the inner end of the generally radial wall 37 of the wall plate 36 is resiliently deformed toward the smaller diameter portion 28 of the housing 10 and thus the wall plate 36 acts as a spring urging the angular contact raceways 31 and 39 away from each other. This spring action preloads the ball complements 20 and 22 in the axial direction with opposing thrust forces thereby eliminating end play between the hollow impeller drive shaft 12 and the housing 10. The reaction forces are taken by the short radial wall portion 34 of the housing 10 with the reaction forces serving to effect a good seal therebetween. If desired, the spring rate of the wall plate 36 may be adjusted, as for instance by slotting the radial wall 37 of the wall plate 36.

As previously mentioned, the ball complements 20 and 22 are located in a sealed bearing chamber 24. The sealed bearing chamber is located to the left of the radial wall on the wall plate 36 and comprises a thin tube 26 necked down at one end which tightly engages against the inner surface of the conical portion 30 and the necked portion of the smaller diameter portion 28 of the housing 10. The other end of the tube 26 engages the outer surface of the inner flange 38 on the wall plate 36 with a slip-fit. The purpose for this slip-fit will be explained later. In those instances where it is not necessary to slot the wall plate 36 for adjusting the spring rate or to otherwise make the wall plate impervious, the tube 26 may be eliminated and the bearing chamber can extend to the inner surface of the conical portion 30 of the housing 10 since the reaction forces between the outer periphery of the wall plate and the short radial portion 34 on the housing effects a good seal therebetween.

Conventional bearing seals having an elastomeric sealing lip engaging the impeller drive shaft 12 are mounted on the left end of the housing 10 and the wall plate 36 completing the closure for the sealed bearing chamber 24 in which the bearing ball complements 20 and 22 are housed. The conventional seals in some instances may be replaced by shields having inner edges spaced closely to the shaft depending to an extent on the type of lubricant in the bearing chamber 24 which is normally filled with grease.

A stamped sheet metal annular end plate 44 has an outer flange 46 press fitted into the larger diameter cylindrical end portion 32 of the housing 10 with its end face abutting the end face of the outer flange 40 of the wall plate 36. The end plate 44 also has an inner sleeve portion 48 extending toward the wall plate 36 with an enlarged free end 50 tightly embracing the beveled outer margin of a ceramic face seal element 52 through interposed conical washers 54 of a soft ductile material such as copper or aluminum. The enlarged free end 50 securing the ceramic face seal element 52 imparts a compressive stress thereto in the circumferential direction with the washers 54 being deformed to effectuate a good seal therebetween. The neck between the enlarged free end 50 and the radial wall 58 of the sheet metal end plate 44 form a trough 56, the advantage of which will be explained later.

The manner in which the circumferential compressive stresses are produced in the ceramic element 52 are well known from the ignition spark plug art.

Briefly the inner sleeve portion 48 is preformed with only one frustoconical portion 48a. The ceramic element 52 and conical washers 54 are then inserted into the enlarged open end of the enlarged portion 50 (left end prior to formation of frustoconical portion 48b closed) of the sleeve portion. The enlarged open end is then deformed into the frustoconical portion 48b while the frustoconical portions 48a and 48b and the enlarged portion 50 therebetween are heated. The heating may be accomplished by application of an electric current using the forming tools as electrodes. The frustoconical portion 48b is formed such that the ceramic element 52 is snugly mounted between the frustonical portions 48a and 48b. Upon cooling, the enlarged portion 50 shrinks causing the frustoconical portions 48a and 48b to impart oblique opposed forces to the beveled ends of the ceramic element 52 in a normal direction. The oblique opposed forces in turn produce circumferential compressive stresses in the ceramic element 52. While the drawings illustrate the inclusion of soft metallic conical washers 54 which cushion and absorb some of the forces applied during the forming operation and provide seals between the ceramic element 52 and the frustoconical portions 48a and 48b, in some instances it may be possible to mount the ceramic element 52 directly in the frustoconical portions 48a and 48b without any intervening washers. However, in either instance the ceramic element 52 is not heat insulated from the end plate 44. Consequently the frictional heat generated by the rubbing engagement between the ceramic element 52 and the annular sealing ridge 70 on the carbon seal ring 68 of the cooperating face seal assembly described below is efficiently dissipated through the end plate 44 which has its left face exposed to the water being pumped through the engine cooling system by the impeller 16.

The cooperating face seal assembly is indicated generally at 60 and comprises a channel-shaped elastomeric friction ring 62 mounted on the hollow impeller shaft 12 in tight sealing engagement with the periphery thereof. The elastomeric friction ring 62 comprises a relatively thick tubular body portion 62a with axially spaced raised shoulders 62b and 62c at the opposite ends thereof. The shoulder 62b is substantially the same thickness as that of the tubular body portion 62a while the shoulder 62c is thinner and has reduced outer diameter in comparison to the shoulder 62b. The shoulder 62c is thinner and smaller in diameter for assembly purposes as will hereinafter be more fully explained.

The face seal assembly 60 further comprises an L-shaped sheet metal spring holder 64 comprising a sleeve portion 64a and an outward flange 64b disposed in the channel of the friction ring 62. The sleeve portion 64a engages the tubular body portion 62a of the friction ring 62 between the shoulders 62b and 62c and compresses the tubular body portion into tight sealing engagement with the periphery of the hollow impeller shaft 12. The dimensions of the sleeve portion 64a are preferably such that the tubular body portion 62a is slightly compressed prior to assembly of the friction ring 62 onto the shaft 12. The integral outward flange 64b of the L-shaped sheet metal spring holder 64 engages the left hand face of the shoulder 62c of the friction ring 62 and preferably compresses this shoulder into engagement with a face of the impeller 16 so as to form a good seal therebetween.

The face seal assembly 60 also comprises a shell 71 secured to the outer periphery portion of the shoulder 62b. More specifically the shell 71 has an integral inward flange 71a at its right end which engages the right hand face of the shoulder 62b and two diametrically opposed indentations 72 which form abutments 72a which engage the left hand face of the shoulder 62b. The abutments 72a and the flange 71a thus straddle the outer peripheral portion of the shoulder 62b securing the shell 71 to the friction ring 62. The inner diameter of the flange 71a is spaced significantly from the tubular body portion 62a and is only slightly smaller than the outer diameter of the shoulder 62c for assembly purposes as will hereinafter be more fully explained.

A carbon face seal ring 68 having an annular sealing ridge 70 is slideably disposed in the left hand portion of the shell 71 outboard of the friction ring shoulder 62b. The carbon face seal ring 68 has a pair of diametrically opposed grooves 68a in its outer periphery which receive the indentations 72 to prevent relative rotation therebetween and provide a driving connection between the shell 71 and the carbon face seal ring 68. The face seal assembly 60 also includes a compact wavy spring washer 66 which is piloted on the sleeve portion 64a of the L-shaped sheet metal spring holder 64. The wavy spring washer 66 engages the flange 64b of the spring holder 64 at a plurality of circumferentially spaced locations and also engages the flange 71a of the shell 71 alternately at a plurality of circumferentially spaced locations. The wavy spring washer 66 thus biases the shoulders 62b and 62c of the friction ring 62 away from each other and consequently biases the carbon face seal ring 68 into sealing engagement with the face of the ceramic seal element 52 with an evenly distributed spring force.

The face seal assembly 60 is assembled in the following manner. First the shell 71 is slipped over the friction ring 62 from the right hand end. The shoulder 62c because of its reduced outer diameter and the flexible nature of the friction ring 62 may be distorted radially inwardly allowing passage through the opening defined by the flange 71a. The shoulders 62b likewise is sufficiently flexible to be squeezed past the indentations 72 in the shell 71 into a position between the abutments 72a and the flange 71a. Next the wavy spring washer 66 is slipped over the right end portion of the friction ring 62 with the shoulder 62c flexibly distorted inwardly to allow the shoulder 62c to pass through the wavy spring washer 66. Next the L-shaped sheet metal spring holder 64 is inserted between the friction ring 62 and the wavy spring washer 66 while the shoulder 62c is distorted inwardly and the wavy spring washer 66 is compressed. Once the L-shaped sheet metal spring holder 64 is in position the shoulder 62c is allowed to return to its normal condition whereupon it engages the right hand face of the flange 64b of the L-shaped sheet metal spring holder 64. Next the carbon face seal ring 68 is inserted into the left end of the shell 71 as a loose piece. While the carbon face seal ring 68 is slideable in the shell 71, relative rotation therebetween is prevented by the indentations 72 disposed in the channels 68a. The face seal assembly 60 may be assembled to the shaft 12 by pressing the precompressed friction ring 62 onto the outer periphery of the shaft 12 from the right hand end. The seal assembly 60 may be axially located by the subsequent press fitting of the central cup portion of the impeller 16 on the right hand end of the shaft. The impeller 16 may not only axially locate the seal assembly 60 but may also be used to slightly compress the shoulder 62c to form a static seal therebetween. In its operative position the face seal assembly 60 biases the annular ridge 70 on the carbon seal ring 68 into engagement with the ceramic face seal element 52 as described above.

The wall plate 36 and the end plate 44 form a chamber 73 within the sheet metal housing 10. Disposed within the chamber 73 is an annular stamped sheet metal baffle 75 of a generally S-shaped configuration having inner, intermediate and outer axial portions 74, 76 and 78 respectively. The inner axial portion 74 is press fitted on the impeller drive shaft 12 for rotation therewith. The intermediate axial portion 76 has an inner circumferential surface 80 which is spaced closely adjacent an outer circumferential surface 82 on the sleeve 48 of the end plate 44 so as to impede the flow of fluid and the passage of dirt and other deleterious matter therebetween. Similarly the outer axial portion 78 of the baffle 75 has an outer circumferential surface 84 spaced closely adjacent the flange 40 on the wall plate 36 forming part of a circumferential surface of the chamber 73 so as to impede the flow of fluid and the passage of dirt and the like therebetween. While it is preferable from a sealing standpoint to have the flange 40 continuous, as pointed out previously, the flange 40 may be discontinuous for ease of forming, however even in this instance, the proximity of a discontinuous flange impedes the flow of fluid and the passage of dirt and the like. Thus the chamber 73 is partitioned by the baffle plate 75 into an outer compartment 86, an intermediate compartment 88 and an inner compartment 90. The compartment 90 opens into the interior of the conical portion 30 of the housing 10 through the slots 51 and holes 53, however, the bearing chamber 24 is sealed from anything passing therethrough by virtue of the tube 26.

The impeller drive shaft 12 has one or more radial bores 92 aligned with the interface between the ceramic seal element 52 and the carbon face seal 68 and thus the outer compartment 86 communicates directly with the axial bore 94 of the hollow impeller drive shaft 12. The axial bore 94 is open at the left end protruding from the housing 10 but the right end of the bore 94 which is located in a water filled pump chamber when the waterpump impeller assembly is attached to an engine is closed by the sheet metal impeller 16 which is press fitted on the right end of the shaft by a central cup portion. Thus there is provided a drainage path from the outer chamber 86 to the outside of the housing 10. A slot 96 in the bottom of the larger diameter cylindrical end portion 32 of the housing 10 and matching slot 98 in the flange 46 provide drainage from the intermediate chamber 88. Preferably the radial portion 99 connecting the axial portions 76 and 78 of the baffle plate is frustoconical slanting outwardly toward the wall plate 36 with its outer margin in axial alignment with the slots 96 and 98 forming a drainage for the intermediate chamber 88.

The entire sealing arrangement operates as follows. When the waterpump impeller subassembly is operatively assembled to an engine block, the impeller 16 is located in the water filled pump chamber of the engine which means there is water present at the right face of the end plate 44 and stationary ceramic face seal element 52. The interior of the housing 10 is sealed from the water in the first instance by the ridge 70 on the carbon face seal 68 which is biased into sealing engagement with the ceramic face seal element 52 by the wavy spring washer 66. However, it is virtually impossible under normal operating conditions to prevent some water from leaking past the seal interface. In fact, under dynamic conditions, the leakage of a small amount of water is needed to lubricate the rubbing surfaces of the ceramic face seal element 52 and the carbon face seal element 68. The leakage water is disposed of and prevented from reaching the bearing ball complements 20 and 22 in the following manner. Any water leaking past the seal interface between the seal elements 52 and 68 is received in chamber 86 from whence it passes through the radial bore 92 and out through the open end of the axial bore 94 of the hollow impeller drive shaft 12 to the atmosphere. Since this drainage path is relatively large compared to the clearance between the intermediate axial portion 76 of the baffle plate 75 and the sleeve portion 48 of the end plate 44, the water follows this path in preference to entering the intermediate chamber 88 because the small clearance offers a much higher impedance to the flow of fluid through the clearance. Moreover, the radial bore 92 and axial bore 94 provide an overflow capable of handling excessive leakage past the face seal interface. In the event that some portion of the leakage water should pass into the intermediate chamber 88, it will drain out of the intermediate chamber 88 through the aligned slots 96 and 98. In this regard, it should be noted that baffle plate 75 and end plate 44 are configured to promote drainage from the intermediate compartment 88. Water collecting in the upper half of the intermediate chamber 88 or flowing along the upper half of the sleeve 48 is directed into the trough 56 from whence it is directed downwardly toward the aligned drainage slots 96 and 98. The conical portion 99 on the rotating baffle plate 75 funnels water in the upper half of the intermediate compartment 88 toward the trough 56 and water in the lower half toward the aligned drainage slots 96 and 98.

A second high impedance to the flow of water or water vapor toward the bearing is provided by the close clearance between the outer axial portion 78 of the baffle plate 75 and the flange 40 of the wall plate 36. Finally, should the water possibly pass both of these high impedance barriers, the bearing chamber 24 is still protected by the bearing seal mounted in the flange 38 and the tube 26.

These two high impedance barriers permit a much larger drainage slot in the housing 10 then was heretofore possible. This is because during static conditions and even more so during dynamic conditions when the impeller 16 is rotating, the high impedance barrier between the outer axial portion 78 on the baffle plate 75 prevents dirt and the like from entering into the compartment 90 via the drainage slot and the high impedance barrier between the intermediate axial portion 76 and the sleeve portion 48 prevents dirt and the like from entering the compartment 86 and reaching the face seal elements 52 and 68.

Under dynamic conditions, the rotating baffle plate 75 acts somewhat like a fan which tends to induce an air flow in the direction indicated by the arrows 100. This induced air flow expels any water and dirt which may have collected in the hollow drive shaft 12, the compartment 86, or the compartment 88 through the aligned drainage slots 96 and 98 thus providing a self-cleaning feature.

The manner in which the housing 10, wall plate 36, shaft 12, ball complements 20 and 22 and their separators are assembled to preload the ball complements 20 and 22 is as follows. The hollow impeller drive shaft 12, the housing 10 and the ball complement 20 are first assembled into an operative relationship. This may be done by the well known Conrad assembly method in which the shaft 12 is disposed eccentrically within the housing to form an enlarged crescent shape between one side of the shaft 12 and the housing 10 which permits a given number of balls to be inserted into the raceway 42 in a generally axial direction from the left end of the housing 10. These balls are then circumferentially spaced forming the ball complement 20 which centers the left end of the shaft 12 in the housing. The balls in the ball complement 20 are maintained circumferentially spaced by a separator which may be of the type shown in the drawing which comprises a single end ring with spring fingers which snap over the balls when the separator is inserted axially into position from the left end of the housing 10. Alternatively the ball complement 20 may first be assembled into the ball groove 42 and maintained circumferentially spaced by any type of separator and then the assembled shaft 12, ball complement 20 and separator inserted axially into the housing 10 from the left end. The important feature is that the ball complement 20 is assembled into its operative relationship with the housing 10 and shaft 12 before the ball complement 22 is so assembled. The wall plate 36 is inserted into the right end of the housing against the short radial wall 34 either before or after the operative assembly of the ball complement 20. In its free state prior to insertion, the radial wall 37 on the wall plate 36 is preferably slightly frustoconical and slants radially inwardly toward the free end of the flange 40. In practice, the slant is very small on the order of a few degrees. Preferably the flange 40 is also flared outwardly a few degrees and has a maximum diameter at its free end which exceeds by the inner diameter of the larger diameter portion 32 of the housing 10 by a few thousandths of an inch so that after insertion, the wall plate 36 is centered in the housing 10 while permitting a small radial adjustment against the bias of the flange 40.

After insertion of the wall plate 36, the inner margin of the radial wall 37 on the wall plate 36 is resiliently deflected toward the small diameter end of the housing 10. While the radial wall 37 is maintained deflected, the drive shaft 12 is pivoted on the bearing complement 20 radially offsetting the inner race 39 from the axis of the housing 10 so as to form an enlarged crescent shape opening between the drive shaft 12 and the flange 38. A given number of bearing balls are then inserted generally axially into the full raceway groove 43. These balls are then circumferentially spaced and so maintained by an axially inserted separator thus centering the hollow drive shaft in the housing 10 at this second location. After the balls in the ball complement 22 are circumferentially spaced, the inner margin of the radial wall 37 of the wall plate 36 is released. Upon release the wall plate 36 is prevented from returning to its original free unflexed condition by the ball complements 20 and 22 thus producing a spring action which urges the angular contact raceway 39 away from angular contact raceway 31 and preloads the ball complements 20 and 22.

When thus resiliently deflected, the initial slant of the radial wall 37 is flattened at the outer margin providing a relatively wide flat engagement with the radial wall 34 of the housing 10. In those instances where the wall plate 36 is slotted and a sealed bearing is desired, the tube 26 may be utilized. This tube 26 would be inserted into the housing 10 against the conical portion 30 prior to insertion of the wall plate 36. As previously mentioned, the tube 26 has a slip-fit on the inner flange 38 of the wall plate 36. This is to permit the subsequent deflection of the inner margin of the radial wall 37 toward the small diameter portion 28 of the housing 10 during the assembly of the ball complement 22.

We wish it to be understood that we do not desire to be limited to the exact details of construction of the face sealing arrangement and face seal assembly shown and described in the environment of an automotive waterpump subassembly, for obvious modifications will occur to a person skilled in the art both for the disclosed and other similar environments.

We claim:

1. A face sealing arrangement for an automotive waterpump or the like having a rotatable impeller shaft protruding through an opening in a housing end wall, comprising in combination:
   - an inner sleeve portion integral with said housing end wall and coaxial with said hole through which said impeller shaft protrudes,
   - an annular face seal element of low tensile strength material having outer beveled ends securely mounted in said sleeve portion and radially spaced from said shaft,
   - heat conductive means producing circumferential compressive stresses in said face seal element, said heat conductive means including spaced frustoconical portions of said sleeve portion which impart oblique opposed forces to said beveled ends to produce the circumferential compressive stresses in said face seal element,
   - said sleeve portion being an integral part of a heat conductive end wall having a surface juxtaposed to an impeller carried by said impeller shaft whereby said sleeve portion and said end wall are adapted to dissipate heat from said annular face seal element into fluid being pumped by said impeller during operation of the pump, and
   - a cooperative face seal assembly secured to said impeller shaft, said face seal assembly including a face seal ring and means biasing said face seal ring into sealing engagement with said annular face seal element.

* * * * *